US012495367B2

(12) United States Patent
De Ruijter (10) Patent No.: US 12,495,367 B2
(45) Date of Patent: Dec. 9, 2025

(54) SYSTEM, METHOD AND APPARATUS FOR ADAPTIVELY CONTROLLING TRANSMIT POWER BASED ON ENERGY DETECTION

(71) Applicant: Silicon Laboratories Inc., Austin, TX (US)

(72) Inventor: Hendricus De Ruijter, Roseville, CA (US)

(73) Assignee: Silicon Laboratories Inc., Austin, TX (US)

( * ) Notice: Subject to any disclaimer, the term of this patent is extended or adjusted under 35 U.S.C. 154(b) by 328 days.

(21) Appl. No.: 18/357,329

(22) Filed: Jul. 24, 2023

(65) Prior Publication Data

US 2025/0024380 A1 Jan. 16, 2025

Related U.S. Application Data

(60) Provisional application No. 63/513,141, filed on Jul. 12, 2023.

(51) Int. Cl.
*H04W 52/24* (2009.01)
*H04W 52/36* (2009.01)
*H04W 52/50* (2009.01)

(52) U.S. Cl.
CPC ....... *H04W 52/245* (2013.01); *H04W 52/367* (2013.01); *H04W 52/50* (2013.01)

(58) Field of Classification Search
CPC ... H04W 52/24; H04W 52/245; H04W 52/36; H04W 52/367; H04W 52/50; H04L 1/0026; H04L 1/0029
See application file for complete search history.

(56) References Cited

U.S. PATENT DOCUMENTS

| | | | | |
|---|---|---|---|---|
| 9,537,688 | B2 * | 1/2017 | Merlin | H04W 74/0808 |
| 10,136,346 | B2 * | 11/2018 | Kwon | H04W 24/08 |
| 10,306,676 | B2 * | 5/2019 | Zhang | H04B 17/309 |
| 10,361,835 | B2 * | 7/2019 | Guo | H04L 43/16 |
| 10,721,642 | B2 * | 7/2020 | Kwon | H04W 24/08 |
| 10,841,150 | B2 * | 11/2020 | Sadeghi | H04L 27/2603 |
| 11,357,047 | B2 * | 6/2022 | Pandian | H04W 72/541 |
| 11,470,642 | B2 * | 10/2022 | Xue | H04W 74/0808 |
| 11,659,496 | B2 * | 5/2023 | Oteri | H04W 52/243 |
| | | | | 455/522 |
| 11,811,442 | B2 * | 11/2023 | de Ruijter | H04B 1/18 |
| 11,917,679 | B2 * | 2/2024 | Abotabl | H04L 5/0062 |
| 12,068,811 | B2 * | 8/2024 | Yang | H04L 1/0017 |
| 12,127,249 | B2 * | 10/2024 | Li | H04W 74/0808 |
| 12,200,472 | B2 * | 1/2025 | Ali | H04L 41/40 |
| 12,301,376 | B2 * | 5/2025 | Reshef | H04W 52/50 |

(Continued)

FOREIGN PATENT DOCUMENTS

WO WO-2017014685 A1 * 1/2017 ........ H04W 74/0816

*Primary Examiner* — Hai V Nguyen
(74) *Attorney, Agent, or Firm* — Trop, Pruner & Hu, P.C.

(57) ABSTRACT

In one aspect, a method includes: detecting, in a receiver of a wireless device, an energy of a first wireless channel; determining whether the detected energy is within a range between a first threshold and a second threshold; and in response to determining that the detected energy is within the range, transmitting, from a transmitter of the wireless device, a first radio frequency (RF) signal within the first wireless channel at a power level less than a maximum power level.

20 Claims, 6 Drawing Sheets

(56) References Cited

U.S. PATENT DOCUMENTS

| | | | | |
|---|---|---|---|---|
| 2007/0002890 | A1* | 1/2007 | Mangold | H04W 16/14 |
| | | | | 370/459 |
| 2007/0286122 | A1* | 12/2007 | Fonseca | H04W 72/542 |
| | | | | 370/329 |
| 2016/0164646 | A1* | 6/2016 | Kwon | H04W 24/08 |
| | | | | 370/252 |
| 2018/0027588 | A1* | 1/2018 | Vijayasankar | H04W 74/0808 |
| | | | | 370/329 |
| 2018/0367286 | A1* | 12/2018 | Guo | H04L 5/0064 |
| 2019/0007973 | A1* | 1/2019 | Lou | H04W 74/006 |
| 2019/0110318 | A1* | 4/2019 | Zhang | H04B 17/309 |
| 2019/0280919 | A1* | 9/2019 | Sadeghi | H04W 72/04 |
| 2021/0242894 | A1* | 8/2021 | de Ruijter | H04B 1/18 |
| 2021/0307065 | A1* | 9/2021 | Xue | H04W 52/16 |
| 2021/0360694 | A1* | 11/2021 | Pandian | H04W 72/541 |
| 2022/0116991 | A1* | 4/2022 | Wilhelmsson | H04W 74/06 |
| 2022/0191733 | A1* | 6/2022 | Ali | H04L 41/0806 |
| 2022/0360946 | A1* | 11/2022 | Zhao | H04W 4/06 |
| 2022/0377786 | A1* | 11/2022 | Xue | H04W 24/08 |
| 2022/0386367 | A1* | 12/2022 | Abotabl | H04L 5/0062 |
| 2024/0056133 | A1* | 2/2024 | Yang | H03M 13/6513 |
| 2024/0147528 | A1* | 5/2024 | Lehti | H04W 74/002 |

* cited by examiner

SYSTEM, METHOD AND APPARATUS FOR ADAPTIVELY CONTROLLING TRANSMIT POWER BASED ON ENERGY DETECTION

CROSS-REFERENCE TO RELATED APPLICATION

This application claims the benefit of U.S. Provisional Application No. 63/513,141, filed on Jul. 12, 2023, and entitled "SYSTEM, METHOD AND APPARATUS FOR ADAPTIVELY CONTROLLING TRANSMIT POWER BASED ON ENERGY DETECTION."

BACKGROUND

Wireless devices are ubiquitous in today's society. Various types of wireless devices can be located in a close area to each other, such that one or more wireless devices can interfere with one or more other wireless devices. This is particularly so, given that various types of devices may communicate using different wireless communication protocols. For example, in the 915 Megahertz (MHz) industrial scientific and medical (ISM) band, a variety of different wireless devices are available. Some may communicate according to the IEEE 802.11ah standard (HaLow), which consumes a relatively large modulation bandwidth compared to other PHYs like Smart Ubiquitous Network (SUN) Frequency Shift Keying (FSK) and some SUN Orthogonal Frequency Division Multiplexing (OFDM) PHYs, both defined in the IEEE 802.15.4 standard. Communications by HaLow devices may occur at relatively high power levels (up to 30 dBm according to FCC regulations), which can undesirably interfere with other devices in a common area.

Such interference can especially occur when the higher power transmitting devices are closely adjacent to wireless devices that communicate according to other wireless communication protocols that do not transmit at such high power or prevent transmission in the presence of substantial interfering signals. For example, wireless devices that communicate according to a smart ubiquitous network protocol, e.g., a Wi-SUN protocol, are typically configured to perform a Clear Channel Assessment and not allow transmission in a given wireless channel when there are interfering signals in that same wireless channel with interfering levels exceeding an Energy Detection (ED) threshold. Thus presence of interfering devices can adversely impact communication by these Wi-SUN devices.

SUMMARY OF THE INVENTION

In one aspect, a method includes: detecting, in a receiver of a wireless device, an energy of a first wireless channel; determining whether the detected energy is within a range between a first threshold and a second threshold; and in response to determining that the detected energy is within the range, transmitting, from a transmitter of the wireless device, a first radio frequency (RF) signal within the first wireless channel at a power level less than a maximum power level.

In one implementation, the method further comprises determining the power level less than the maximum power level based at least in part on the detected energy. The power level less than the maximum power level may be determined based on the maximum power level, the detected energy and the second threshold. The method may further comprise in response to determining that the detected energy is greater than the first threshold, not transmitting the first RF signal within the first wireless channel. The method may further comprise in response to determining that the detected energy is less than the second threshold, transmitting the first RF signal within the first wireless channel at the maximum power level, the second threshold less than the first threshold.

In one implementation, the method further comprises detecting the energy of the first wireless channel according to a received signal strength indicator metric. The method may also include detecting the energy of the first wireless channel from a second RF signal transmitted by a second wireless device, the second wireless device operating according to a second wireless communication protocol, the first wireless device operating according to a first wireless communication protocol.

In one implementation, the method may further comprise not transmitting the first RF signal within the first wireless channel, in response to: determining that a link margin for a wireless link between the wireless device and a second wireless device requires more transmit power than the power level less than the maximum power level; and determining that the detected energy is within the range.

In one implementation, the method further comprises: determining that a link margin for a wireless link between the wireless device and a second wireless device allows for a lower power level than the maximum power level; and transmitting the first RF signal within the first wireless channel at the lower power level when the detected energy is less than the second threshold. The method may also comprise: transmitting the first RF signal within the first wireless channel at the lower power level when the detected energy is within a first portion of the range between the first threshold and the second threshold, and transmitting the first RF signal within the first wireless channel at the adaptive power level less than the lower power level when the detected energy is within a second portion of the range between the first threshold and the second threshold.

In another aspect, an apparatus includes: first RF circuitry to transmit a first RF signal within a first wireless channel, the first RF circuitry comprising at least one amplifier; second RF circuitry to receive content of the first wireless channel, the second RF circuitry to downconvert the content to a second frequency signal; an analog-to-digital converter (ADC) coupled to the second RF circuitry, the ADC to convert the second frequency signal to a digital signal; a baseband processor coupled to the ADC to process the digital signal; an energy detector to detect an energy of the first wireless channel based on the digital signal; and a controller coupled to the first RF circuitry. The controller may cause the first RF circuitry to transmit the first RF signal within the first wireless channel at an adaptive power level when the detected energy is within a range between a first threshold and a second threshold.

In one implementation, the controller is to determine the adaptive power level based on a maximum power level, the detected energy, and the second threshold. The controller may be configured to: cause the first RF circuitry to transmit the first RF signal within the first wireless channel at a first adaptive power level when the detected energy is of a first value; and thereafter cause the first RF circuitry to transmit the first RF signal within the first wireless channel at a second adaptive power level less than the first adaptive power level when the detected energy is of a second value, the second value greater than the first value.

In one implementation, the controller, in response to the detected energy being greater than the first threshold, is to prevent the first RF circuitry from transmitting the first RF signal within the first wireless channel. The controller, in response to the detected energy being less than the second threshold, may cause the first RF circuitry to transmit the first RF signal within the first wireless channel at a maximum power level, the second threshold less than the first threshold.

In one implementation, the controller, in response to the detected energy being less than the second threshold, is to cause the first RF circuitry to transmit the first RF signal within the first wireless channel at a power level based on a link headroom, the power level less than the maximum power level. The controller may send a control signal to the at least one amplifier to cause the first RF circuitry to transmit the first RF signal within the first wireless channel at the power level less than the maximum power level.

In yet another aspect, a system includes at least a receiver, a transmitter and a controller. The receiver may be configured to receive a first radio frequency (RF) signal within a wireless channel, and includes: a first RF front end circuit to process the first RF signal into a lower frequency signal; and a baseband processor coupled to the first RF front end circuit to process the lower frequency signal. The transmitter may be configured to transmit a second RF signal within the wireless channel, and includes: a second RF front end circuit to receive a second lower frequency signal from the baseband processor and upconvert the second lower frequency signal to the second RF signal. The controller may be configured to: identify an energy detected within the wireless channel; determine whether the energy detected is in a conditional clear channel assessment (CCA) region, the conditional CCA region between a CCA pass region and a CCA fail region; and when the detected energy is in the conditional CCA region: determine an adaptive power level for the second RF signal based at least in part on the detected energy and a link margin for a wireless link between the system and a second system; and cause the transmitter to transmit the second RF signal within the wireless channel at the adaptive power level.

In one implementation, when the detected energy is in the CCA pass region, the controller may cause the transmitter to transmit the second RF signal within the wireless channel at a predetermined power level, the predetermined power level at least as great as the adaptive power level. When the detected energy is in the CCA fail region, the controller may prevent the transmitter from transmitting the second RF signal within the wireless channel.

DETAILED DESCRIPTION

In various embodiments, a wireless device is configured to detect energy present in a given wireless channel, and use this information to adaptively control transmit power levels in that wireless channel. More specifically as described herein, based at least in part on an energy detection determination, an appropriate and adaptive transmit power level may be determined for a transmitter of a wireless device. While embodiments described herein are in the context of a wireless device communicating according to Wi-Fi and/or Wi-SUN wireless communication protocols, understand that embodiments are not limited in this regard and implementations are applicable to other wireless devices.

Figure 1:
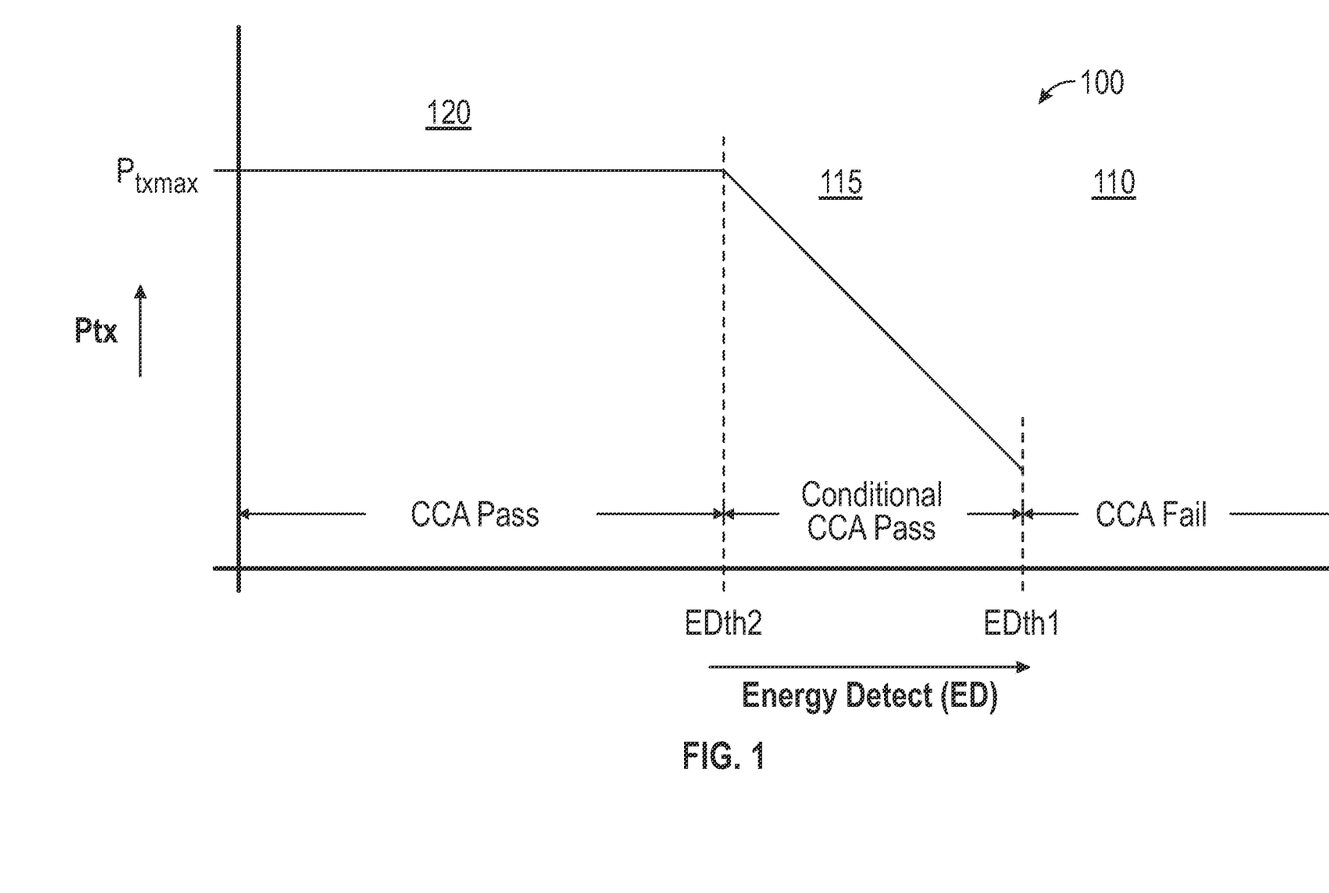
FIG. 1 is a graphical illustration of energy detection-based adaptive power control in accordance with an embodiment.

Referring now to FIG. 1, shown is a graphical illustration of energy detection-based adaptive power control in accordance with an embodiment. As shown in FIG. 1, graphical illustration 100 illustrates a transmit power level (Ptx, on the Y-axis) with respect to a detected energy level (ED, on the X-axis). The energy detection may be performed in various manners. For purposes of discussion, assume that the energy detection is based on a received signal strength indicator (RSSI) metric, which may be determined in receiver hardware, e.g., an RSSI detector; of course other metrics such as channel power determination (uncompensated for front end gain settings from an Automatic Gain Control circuit) also may be used depending upon implementation.

As seen in FIG. 1, when an energy level detected in a wireless channel is above a first threshold (EDth1), a clear channel assessment (CCA) evaluation fails (region 110), and the wireless device is prevented from communication within that wireless channel. This is so, since with a high level of detected energy, it may be assumed that at least one other device in a local area is already communicating within the wireless channel. Note that when a level of detected energy prevents a transmission, the wireless device may start a retry scheme, with or without back-off time (as opposed to reduced transmit power).

Instead when the energy level detected in the wireless channel is below a second, lower threshold (EDth2), the CCA evaluation passes (region 120), and the wireless device is allowed to communicate within that wireless channel. As shown in region 120, the wireless device is allowed to transmit at a maximum power level (Ptxmax). This is so, since the detected energy is below the second threshold, and thus it may be assumed that there are no significant interfering devices within a region of the wireless device. In contrast, some protocols provide for a single CCA threshold, and further this single CCA threshold may be set aggressively. In such cases, especially at higher transmit power levels, without an embodiment in which multiple thresholds are provided, a device may decide to transmit and disturb on-going communications of other devices.

Still with reference to FIG. 1, when it is determined that the energy level detected in the wireless channel is in a range (region 115) between the two thresholds, the CCA evaluation conditionally passes. In this conditional CCA pass situation, the wireless device is allowed to communicate within that wireless channel, at an adaptive power level that is less than the maximum power level.

In this conditional CCA region, the transmit power level decreases as the energy detected increases. In this way, the wireless device is allowed to transmit in the CCA conditional region at an adaptive power level. The adaptive power level may be controlled to be a function of the energy detected in this conditional CCA region. Stated another way, the wireless device is configured to transmit in this conditional range at an adaptive power level that is based at least in part on the detected energy within the wireless channel. Note that FIG. 1 shows that this adaptive transmit power control is according to a linearly decreasing function in which the transmit power decreases as the detected energy increases. However in other implementations, a non-linear function may be used.

In an example implementation, the first energy detection threshold may be set at a level of −75 dBm and the second energy detection threshold may be set at a level of −95 dBm. Note that these detection thresholds may be stored in one or more storages of the receiver (e.g., within configuration registers and/or non-volatile memory). Of course, other values can be used in other implementations. In a given implementation, the maximum transmit power level may be at a level of 30 dBm, although other values are possible.

In one or more embodiments, a wireless device may be configured to be a so-called good neighbor, such that it may allow other wireless devices in a local area with it to communicate at the same or close frequencies in a manner designed to reduce interference. To this end, the wireless device may be configured to identify an available link margin. This margin may be established during a communication session between the wireless device and a communicating partner. The link margin may be derived from the energy detection, the Link Quality Indicator (LQI), as described in IEEE 802.15.4, eye opening, a signal-to-noise ratio or a combination of at least two of these methods. When it is determined that there is sufficient link margin, the transmitter of the wireless device may transmit at lower power, yet provide signaling of acceptable quality to its receiving partner. Alternatively, when it is determined that there is sufficient link margin, the second energy detection threshold may be adjusted lower to an adjusted second energy detection threshold. The first energy detection threshold may be lowered by the same amount to an adjusted first energy detection threshold. If the minimum transmit power is reached, e.g., as a result of a hardware limitation, the packet can still be transmitted at the minimum transmit power, as long as the energy detection value does not exceed the first energy detection threshold.

Embodiments of the adaptive power control techniques described herein may be used in connection with link margining techniques to enable adaptive power control at even lower transmit power levels, thus reducing power consumption and limiting interfering impacts on other devices.

In one embodiment, when a link margin determination indicates that there is no available link margin and transmission is required to be at a maximum power level, there may be an option to forego adaptive power control within a conditional CCA region. That is, instead of providing a conditional CCA region, the wireless device may be configured for only a CCA pass region and a CCA fail region. In this implementation, transmission may be at the maximum power level within the CCA pass region, and transmission is prevented within the CCA fail region.

Figure 2A:
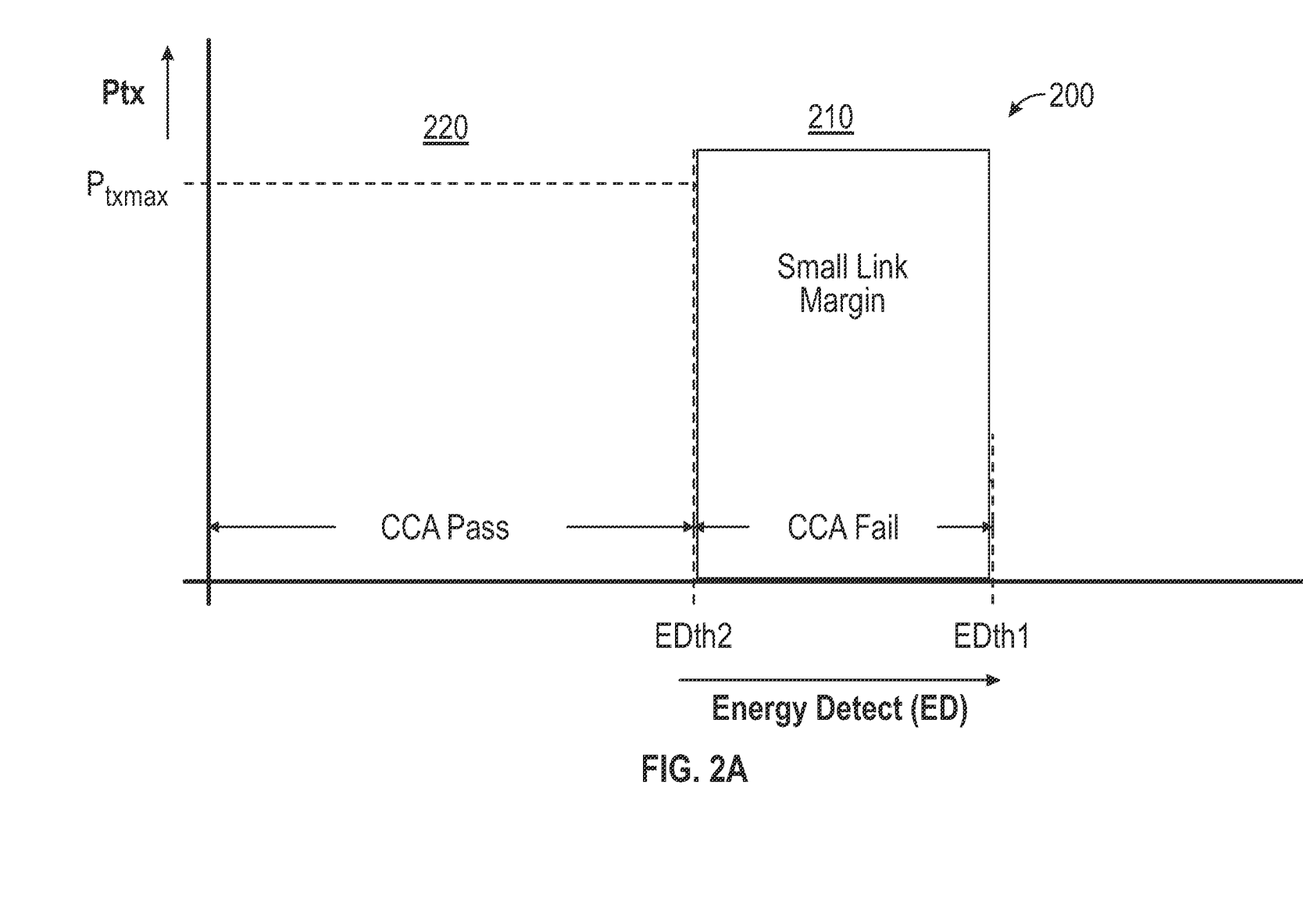
FIG. 2A is a graphical illustration of energy detection-based adaptive power control in accordance with another embodiment.

Referring now to FIG. 2A, shown is a graphical illustration of energy detection-based adaptive power control in accordance with another embodiment. As shown in FIG. 2A, graphical illustration 200 is of the same general form as illustration 100 of FIG. 1 (with common reference numerals, albeit of the "200" series"), and thus common components are not discussed further. Illustration 200 shows a configuration in which there is only a small link margin and as such, the wireless device is required to transmit at the maximum power level. In this case, there is no conditional CCA pass region, and thus, transmission occurs at the maximum power level in CCA pass region 220, and is not allowed in CCA fail region 210.

In an example, when a link margin determination indicates that there is available link margin such that transmission need not be at a maximum power level, a predetermined power level lower than the maximum power level may be used in the CCA pass region. This same predetermined power level may also be used for at least a portion of a conditional CCA region, e.g., when the detected energy is at a lower range of this conditional CCA region. Instead when the detected energy is at a higher range of the conditional CCA region, the adaptive power level less than the predetermined power level may be used. As in the above discussion, the wireless device is prevented from transmitting within the CCA fail region.

Figure 2B:
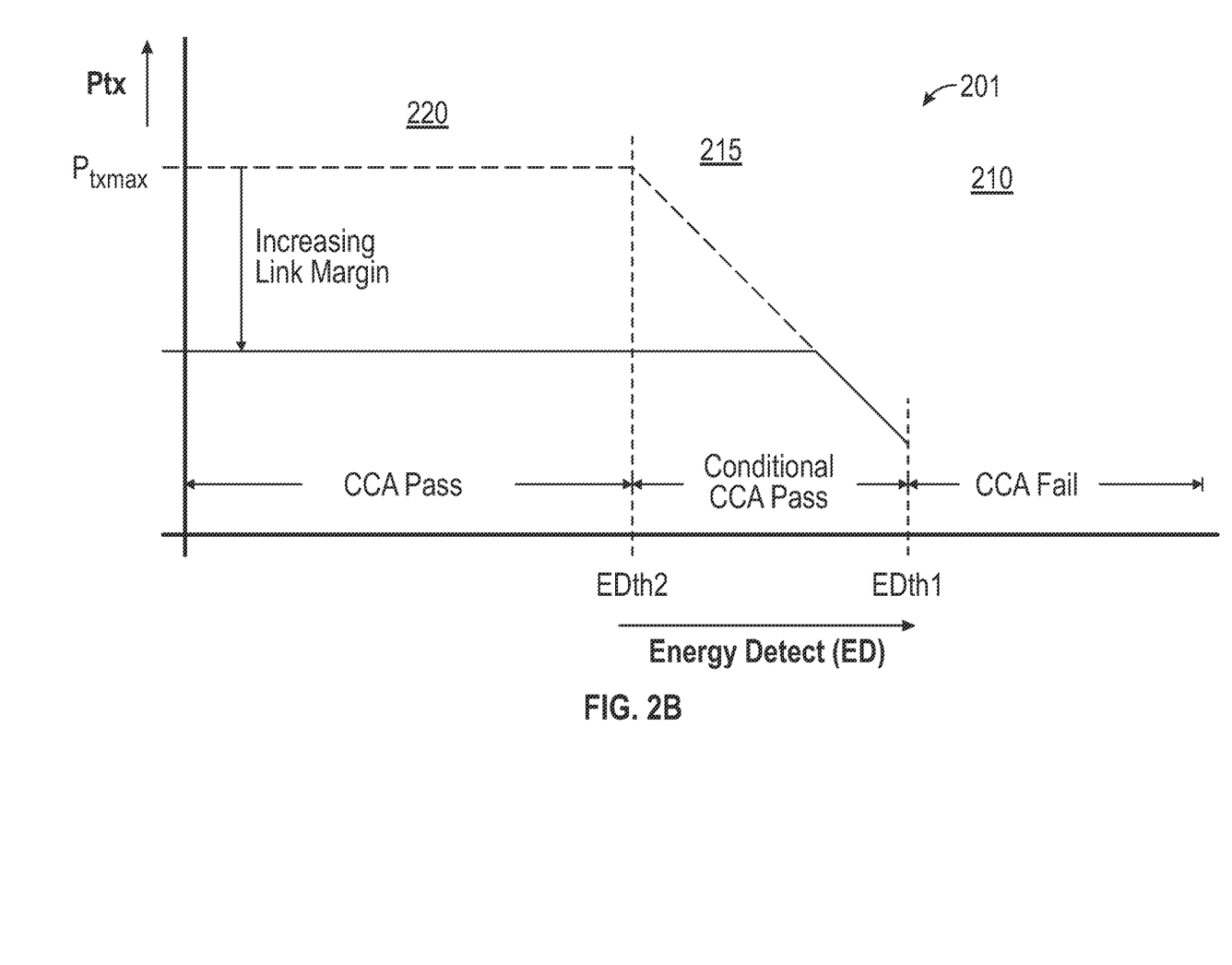
FIG. 2B is a graphical illustration of energy detection-based adaptive power control in accordance with another embodiment.

Referring now to FIG. 2B, shown is a graphical illustration of energy detection-based adaptive power control in accordance with another embodiment. As shown in FIG. 2B, graphical illustration 201 is of the same general form as illustration 100 of FIG. 1 (with common reference numerals, albeit of the "200" series"), and thus common components are not discussed further. Illustration 201 shows a configuration in which there is a higher link margin and as such, the wireless device can transmit at a lower power level than the maximum power level. In this case, a conditional CCA pass region 215 is present. Note that in a first portion of this range, transmission may occur at the same power level as in CCA pass region 220, until a second portion of this range at which a higher detected energy is reached. As shown, at this point, transmission power is reduced to an adaptive power level.

Figure 3:
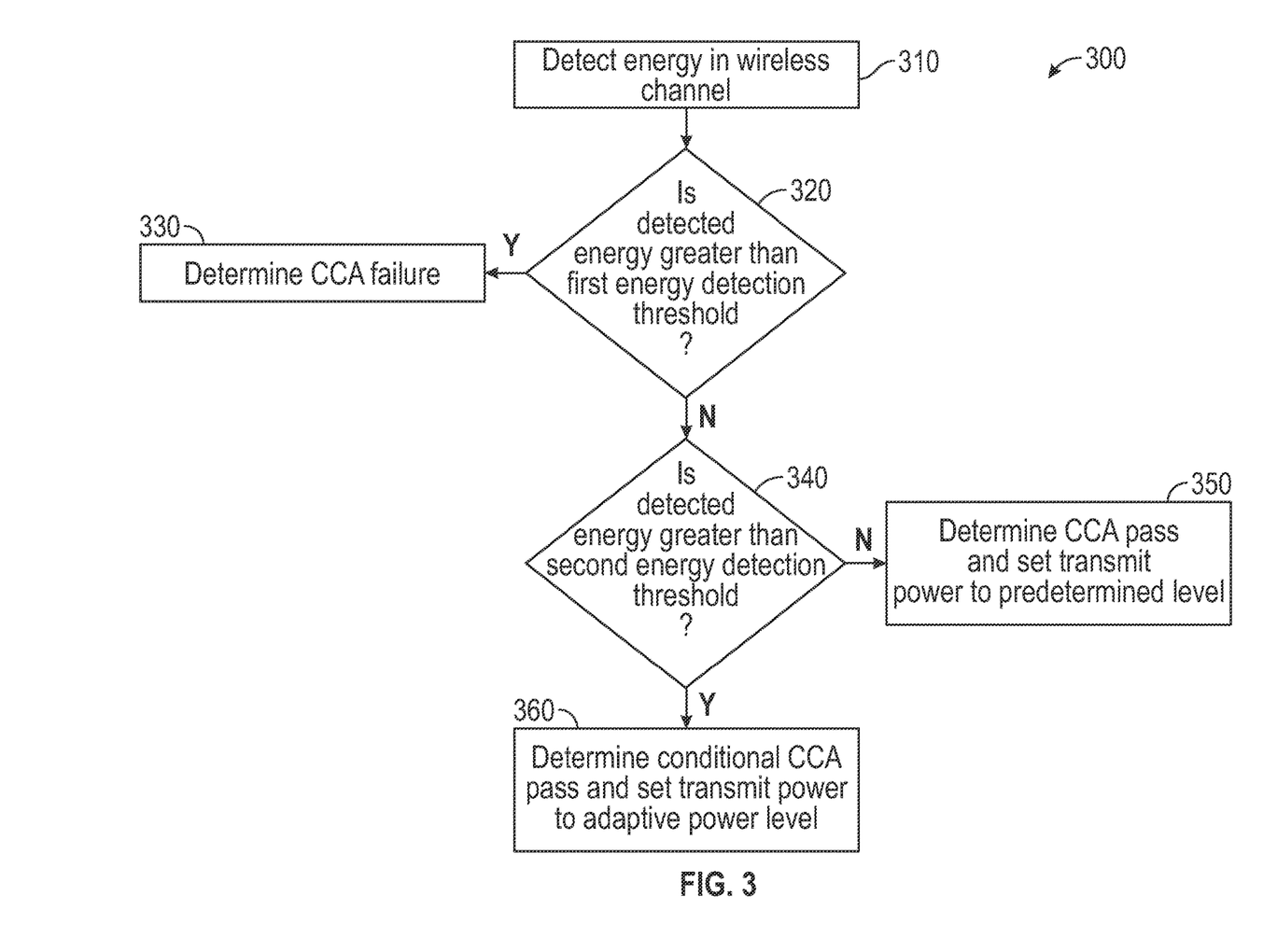
FIG. 3 is a flow diagram of a method in accordance with an embodiment.

Referring now to FIG. 3, shown is a flow diagram of a method in accordance with an embodiment. As shown in FIG. 3, method 300 is a method for adaptively determining a transmit power level for a transmitter based on energy detection as described herein. As such, method 300 may be performed by a controller of the wireless device. Although embodiments are not limited in this regard, the controller may be implemented as a microcontroller or other programmable logic of a wireless device, alone and/or in combination with firmware and/or software.

As illustrated, method 300 begins by performing an energy detection process to detect energy present in a given wireless channel (block 310). As discussed, this energy detection may be performed by RSSI hardware that determines a RSSI metric. Next at diamond 320 it is determined whether the detected energy exceeds a first energy detection threshold (e.g., EDth1). In an embodiment, this first energy detection threshold may be set at a higher level than a second energy detection threshold. When it is determined that the detected energy exceeds this first energy detection threshold, control passes to block 330 where a determination of a CCA failure is made. This is so since the detected energy is within a CCA fail region (e.g., with reference back to FIG. 1).

Still with reference to FIG. 3, if the detected energy does not exceed the first energy detection threshold, control passes to diamond 340, where it is determined whether the detected energy exceeds the second energy detection threshold. If not, control passes to block 350 where a determination of a CCA pass is made. This is so since the detected energy is within a CCA pass region, e.g., with reference back to FIG. 1. In this case, the wireless device is configured to transmit in the wireless channel at a predetermined power level. Depending on implementation, this predetermined power level may be at a maximum transmit power level or a lower power level.

Finally with further reference to FIG. 3, if the energy detected exceeds the second energy detection threshold and is less than the first energy detection threshold, i.e., it is within a range corresponding to a conditional CCA region, control passes to block 360 where an adaptive transmit power may be determined. In one embodiment, this adaptive transmit power may be set according to Equation 1 below:

$$Ptx = Ptxmax - (ED - EDth2) \quad \text{[Equation 1]}$$

where the variables are as described above with regard to FIG. 1. Of course, other means of determining an adaptive power level can be used in other embodiments. Although shown at this high level in the embodiment of FIG. 3, many variations and alternatives are possible.

Figure 4:
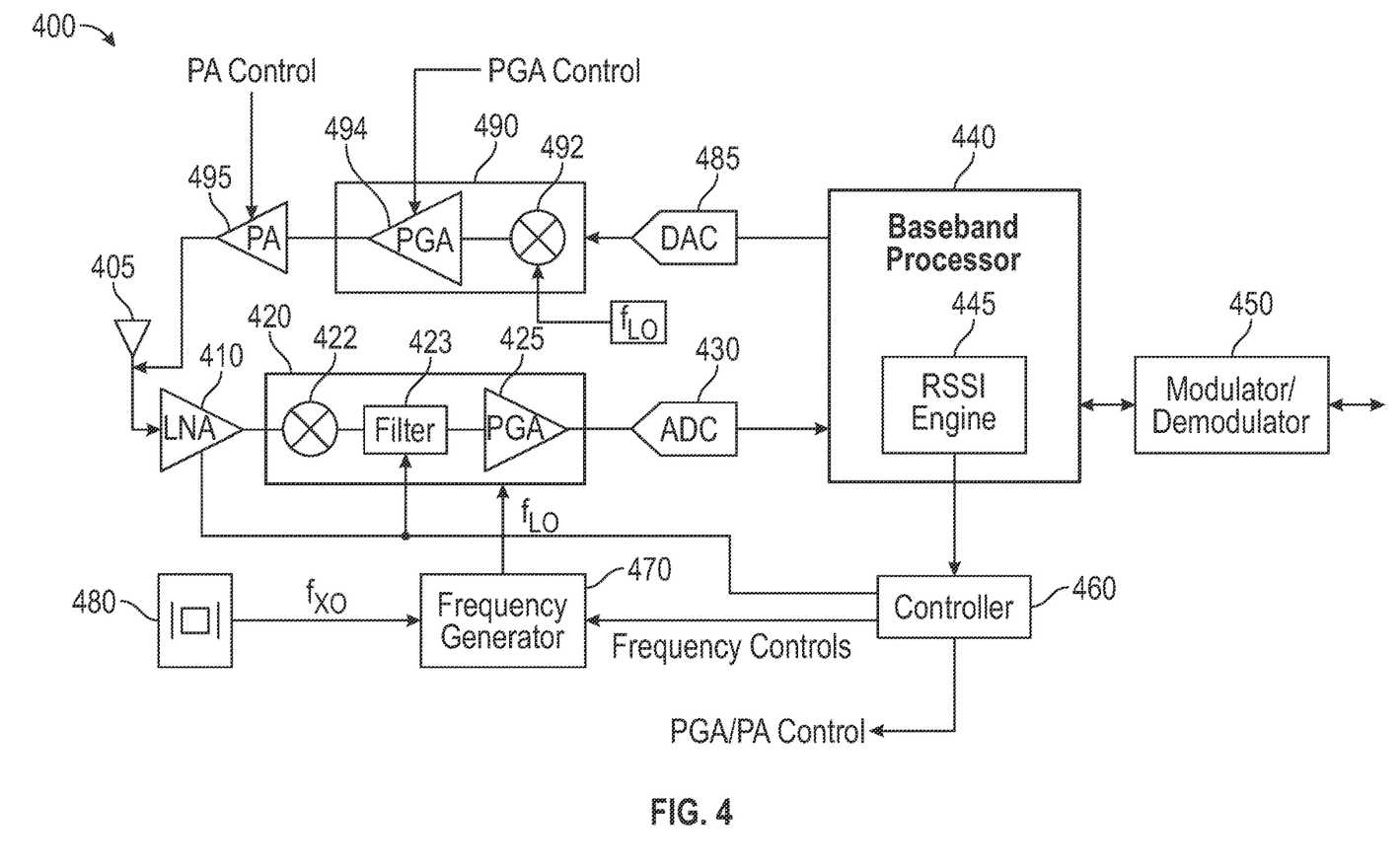
FIG. 4 is a block diagram of a wireless device in accordance with an embodiment.

Referring now to FIG. 4, shown is a block diagram of a wireless device in accordance with an embodiment. As shown in FIG. 4, wireless device 400 may be implemented, in some cases, as an IoT device, and may include one or more integrated circuits, memory, and so forth. In an embodiment, all circuitry shown in FIG. 4 with the exception of an external antenna 405 and a reference oscillator 480 (e.g., a crystal oscillator) may be implemented on a single semiconductor die that includes both transmitter and receiver functionality.

In the embodiment shown, incoming RF signals are received via antenna 405 and provided to a signal processing path including a low noise amplifier (LNA) 410. After appropriate amplification, the incoming RF signals are provided to an RF circuit 420. In various implementations, RF circuit 420 includes a mixer 422 configured to downconvert an RF signal to a lower frequency signal, e.g., an intermediate frequency (IF) signal such as a low-IF signal, zero IF signal, or other lower frequency signal. RF circuit 420 also may include various filtering circuitry including an analog filter 423, and gain circuitry including a programmable gain amplifier (PGA) 425, and so forth. In some embodiments, gain of one or more of LNA 410 and PGA 425 may be dynamically controlled based on gain settings, e.g., from an automatic gain controller (AGC), which may be implemented in a controller 460.

To this end, mixer 425, which in some cases may be a complex mixer, is configured to downconvert the incoming RF signals using a mixing signal having a mixing frequency, shown as mixing signal ($f_{LO}$) received from a frequency generator 470. As one example, frequency generator 470 may be a local oscillator (LO) that may be implemented as a phase locked loop (PLL). Frequency generator 470 may generate the mixing signal using an incoming oscillator signal, $f_{xo}$, received from reference oscillator 480. Controller 460 may provide frequency controls to frequency generator 470 to cause it to generate an appropriate LO clock signal based on a given wireless channel. Understand that depending on implementation, RF circuit 420 may further include another mixer to convert an IF signal to a zero-IF signal.

Still referring to the signal processing path of receiver 400, the downconverted signals output from RF circuit 420 are provided to a digitizer, shown in FIG. 4 as an analog-to-digital converter (ADC) 430, which digitizes the signals. In turn, these digitized signals, which may be at baseband, are provided to a baseband processor 440. Although shown as a standalone baseband processor in the FIG. 4 embodiment, baseband processor 440 in some cases may be implemented within a digital signal processor (DSP).

After various baseband processing, which may include filtering, digital mixing, decimation and so forth, resulting baseband-processed signals may be provided to a demodulator 450 that demodulates these signals. The resulting demodulated signals may be output from demodulator 450 and provided to further downstream processing circuitry (not shown for ease of illustration in FIG. 4).

Baseband processor 440 may include an RSSI engine 445. Although shown as being included within baseband processor 440, in other implementations RSSI engine 445 may be a separate component. RSSI engine 445 is configured to generate an RSSI metric based on energy detected in a given wireless channel.

In an embodiment, RSSI engine 445 sends resulting RSSI information to controller 460. Although controller 460 is shown as a separate component in FIG. 4, it is possible in some implementations for this controller to be included within baseband processor 440 (or as part of a DSP in some implementations). In any event, controller 460 may include either dedicated or programmable hardware circuitry configured to control one or more parameters and/or configuration of wireless device 400 based at least in part on the received RSSI information (one example of an energy detection metric). For example, based at least in part on the received RSSI information, controller 460 determines whether the transmitter is allowed to transmit within the wireless channel, and if so, at what power level, as discussed above. To this end, controller 460 may include or be coupled to a non-volatile storage or other non-transitory storage medium to store instructions and data usable for such operation.

As further shown in FIG. 4, wireless device 400 includes transmit signal path circuitry including a digital-to-analog converter (DAC) 485, which provides analog signals to an RF circuit 490. As shown, RF circuit 490 includes a mixer 492 to upconvert the incoming signal to RF signals, which in turn are provided to a PGA 494. As shown, PGA 494 receives (from controller 460) PGA control information, which may be based at least in part on the energy detection techniques described herein. In turn, RF circuit 490 is coupled to a power amplifier 495, which receives (from controller 460) PA control information, based at least in part on the energy detection techniques described herein. As such, the transmitter may transmit RF signals at an adaptive power level based on the detected energy. Understand that while shown at this high level in the embodiment of FIG. 4, many variations and alternatives are possible.

Figure 5:
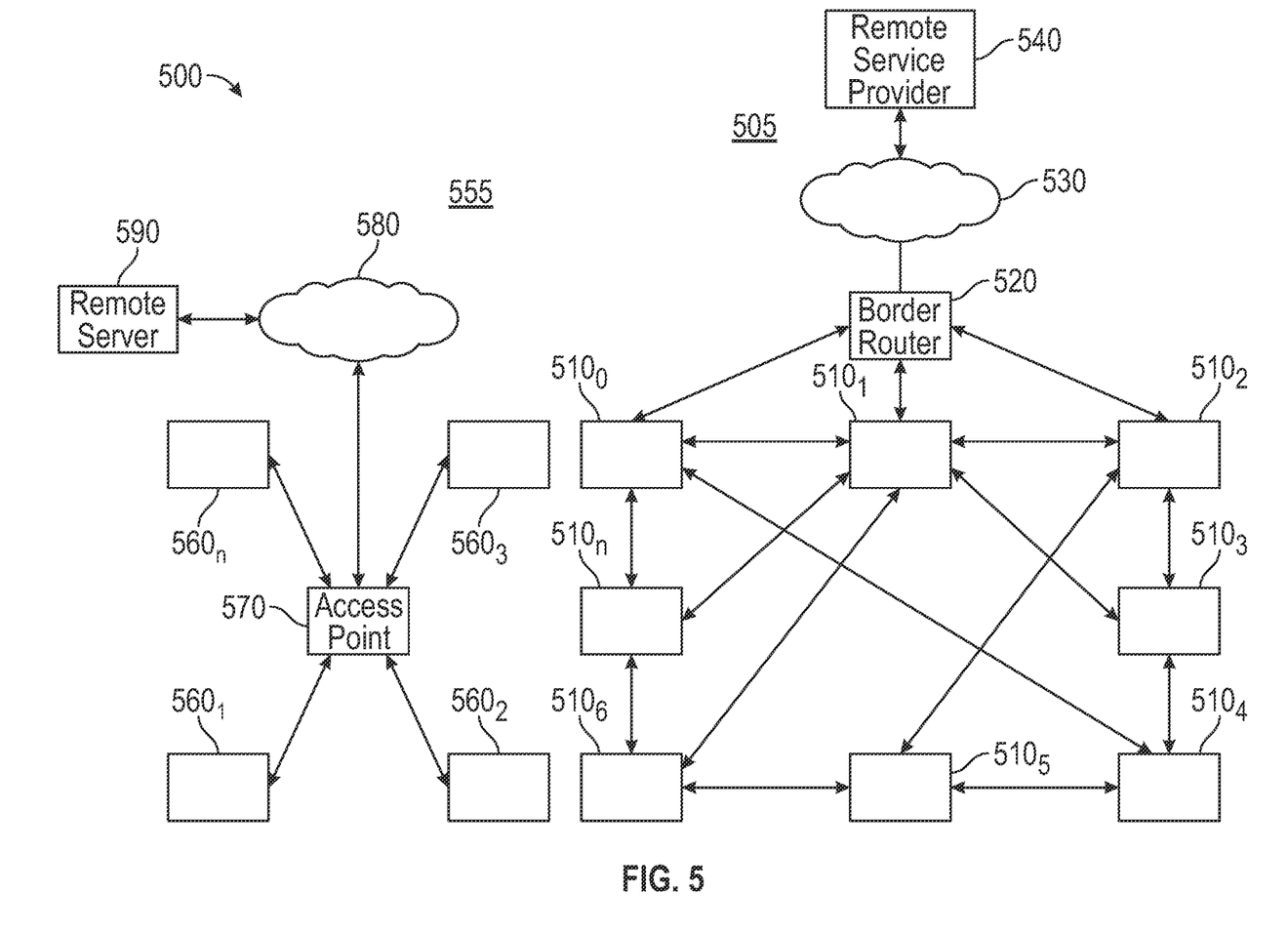
FIG. 5 is a high level diagram of an environment including networks in accordance with an embodiment.

Referring now to FIG. 5, shown is a high level diagram of an environment 500 including networks in accordance with an embodiment. As shown in FIG. 5, a first network 505 includes a variety of devices, including wireless stations including smart devices such as IoT devices, routers, and remote service providers, which may leverage embodiments to reduce interference and power consumption.

In the embodiment of FIG. 5, first network 505 includes multiple wireless devices 5100-n. Although embodiments are not limited in this regard, wireless devices 510 may be implemented as IoT devices configured to communicate according, e.g., to an IEEE 802.15.4 communication protocol, such as a Wi-SUN wireless communication protocol. Wireless devices 510 couple to a border router 520 that that in turn communicates with a remote service provider 540 via a wide area network 530, e.g., the internet.

As further shown in FIG. 5, a second wireless network 555 is present and includes a plurality of wireless devices 5600-n, which communicate with an access point 570. Access point 570 in turn may communicate with a remote server 590 via the internet 580.

As an example, wireless devices 560 may be configured to communicate in a sub-GHz band according to a given IEEE 802.11 standard, such as IEEE 802.11ah. As such these devices may transmit at undesirably high levels such that that may cause interference with one or more of wireless devices 510, which also may communicate in the same band. With embodiments, devices 510 (and/or devices 560) may use the techniques described herein to identify available wireless channels and adaptive power levels. Understand while shown at this high level in the embodiment of FIG. 5, many variations and alternatives are possible.

Thus with embodiments, wireless devices may be configured to determine appropriate nodes that are near each other and can communicate without too much disturbance to nodes having communications that are further away. Embodiments may be used in a variety of network contexts, including mesh networks with close range options.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   detecting, in a receiver of a wireless device, an energy of a first wireless channel;
   determining whether the detected energy is within a range between a first threshold and a second threshold; and
   in response to determining that the detected energy is within the range, transmitting, from a transmitter of the wireless device, a first radio frequency (RF) signal within the first wireless channel at a power level less than a maximum power level.

2. The method of claim 1, further comprising determining the power level less than the maximum power level based at least in part on the detected energy.

3. The method of claim 1, further comprising determining the power level less than the maximum power level based on the maximum power level, the detected energy and the second threshold.

4. The method of claim 1, further comprising in response to determining that the detected energy is greater than the first threshold, not transmitting the first RF signal within the first wireless channel.

5. The method of claim 1, further comprising in response to determining that the detected energy is less than the second threshold, transmitting the first RF signal within the first wireless channel at the maximum power level, the second threshold less than the first threshold.

6. The method of claim 1, further comprising detecting the energy of the first wireless channel according to a received signal strength indicator metric.

7. The method of claim 1, further comprising detecting the energy of the first wireless channel from a second RF signal transmitted by a second wireless device, the second wireless device operating according to a second wireless communication protocol, the first wireless device operating according to a first wireless communication protocol.

8. The method of claim 1, further comprising not transmitting the first RF signal within the first wireless channel, in response to:
   determining that a link margin for a wireless link between the wireless device and a second wireless device requires more transmit power than the power level less than the maximum power level; and
   determining that the detected energy is within the range.

9. The method of claim 1, further comprising:
   determining that a link margin for a wireless link between the wireless device and a second wireless device allows for a lower power level than the maximum power level; and
   transmitting the first RF signal within the first wireless channel at the lower power level when the detected energy is less than the second threshold.

10. The method of claim 9, further comprising:
    transmitting the first RF signal within the first wireless channel at the lower power level when the detected energy is within a first portion of the range between the first threshold and the second threshold, and
    transmitting the first RF signal within the first wireless channel at an adaptive power level less than the lower power level when the detected energy is within a second portion of the range between the first threshold and the second threshold.

11. An apparatus comprising:
    first radio frequency (RF) circuitry to transmit a first RF signal within a first wireless channel, the first RF circuitry comprising at least one amplifier;
    second RF circuitry to receive content of the first wireless channel, the second RF circuitry to downconvert the content to a second frequency signal;
    an analog-to-digital converter (ADC) coupled to the second RF circuitry, the ADC to convert the second frequency signal to a digital signal;
    a baseband processor coupled to the ADC to process the digital signal;
    an energy detector to detect an energy of the first wireless channel based on the digital signal; and
    a controller coupled to the first RF circuitry, wherein the controller is to cause the first RF circuitry to transmit the first RF signal within the first wireless channel at an adaptive power level when the detected energy is within a range between a first threshold and a second threshold.

12. The apparatus of claim 11, wherein the controller is to determine the adaptive power level based on a maximum power level, the detected energy, and the second threshold.

13. The apparatus of claim 11, wherein the controller is to:
    cause the first RF circuitry to transmit the first RF signal within the first wireless channel at a first adaptive power level when the detected energy is of a first value; and
    thereafter cause the first RF circuitry to transmit the first RF signal within the first wireless channel at a second adaptive power level less than the first adaptive power level when the detected energy is of a second value, the second value greater than the first value.

14. The apparatus of claim 11, wherein the controller, in response to the detected energy being greater than the first threshold, is to prevent the first RF circuitry from transmitting the first RF signal within the first wireless channel.

15. The apparatus of claim 11, wherein the controller, in response to the detected energy being less than the second threshold, is to cause the first RF circuitry to transmit the first RF signal within the first wireless channel at a maximum power level, the second threshold less than the first threshold.

16. The apparatus of claim 11, wherein the controller, in response to the detected energy being less than the second threshold, is to cause the first RF circuitry to transmit the first RF signal within the first wireless channel at a power level based on a link headroom, the power level less than a maximum power level.

17. The apparatus of claim 16, wherein the controller is to send a control signal to the at least one amplifier to cause the first RF circuitry to transmit the first RF signal within the first wireless channel at the power level less than the maximum power level.

18. A system comprising:
- a receiver to receive a first radio frequency (RF) signal within a wireless channel, the receiver comprising:
  - a first RF front end circuit to process the first RF signal into a lower frequency signal; and
  - a baseband processor coupled to the first RF front end circuit to process the lower frequency signal;
- a transmitter to transmit a second RF signal within the wireless channel, the transmitter comprising:
  - a second RF front end circuit to receive a second lower frequency signal from the baseband processor and upconvert the second lower frequency signal to the second RF signal; and
- a controller coupled to the receiver and the transmitter, wherein the controller is to:
  - identify an energy detected within the wireless channel;
  - determine whether the energy detected is in a conditional clear channel assessment (CCA) region, the conditional CCA region between a CCA pass region and a CCA fail region; and
  - when the detected energy is in the conditional CCA region:
    - determine an adaptive power level for the second RF signal based at least in part on the detected energy and a link margin for a wireless link between the system and a second system; and
    - cause the transmitter to transmit the second RF signal within the wireless channel at the adaptive power level.

19. The system of claim 18, wherein when the detected energy is in the CCA pass region, the controller is to cause the transmitter to transmit the second RF signal within the wireless channel at a predetermined power level, the predetermined power level at least as great as the adaptive power level.

20. The system of claim 18, wherein when the detected energy is in the CCA fail region, the controller is to prevent the transmitter from transmitting the second RF signal within the wireless channel.

* * * * *